US012320151B2

(12) United States Patent
Lin

(10) Patent No.: US 12,320,151 B2
(45) Date of Patent: Jun. 3, 2025

(54) DISC TUMBLER CYLINDER LOCK

(71) Applicant: VANCE LOCK INDUSTRIAL CO., LTD., New Taipei (TW)

(72) Inventor: Sheng-Ting Lin, New Taipei (TW)

(73) Assignee: Vance Lock Industrial Co., Ltd., New Taipei (TW)

( * ) Notice: Subject to any disclaimer, the term of this patent is extended or adjusted under 35 U.S.C. 154(b) by 267 days.

(21) Appl. No.: 18/080,471

(22) Filed: Dec. 13, 2022

(65) Prior Publication Data

US 2024/0133209 A1 Apr. 25, 2024
US 2024/0229508 A9 Jul. 11, 2024

(30) Foreign Application Priority Data

Oct. 24, 2022 (TW) ................................ 111140255

(51) Int. Cl.
*E05B 29/00* (2006.01)
*E05B 9/04* (2006.01)

(52) U.S. Cl.
CPC ............ *E05B 29/0013* (2013.01); *E05B 9/04* (2013.01); *E05Y 2201/224* (2013.01); *E05Y 2201/266* (2013.01); *E05Y 2800/12* (2013.01)

(58) Field of Classification Search
CPC ............... E05B 29/006; E05B 29/0066; E05B 29/0013; E05B 29/0033; E05B 29/0053;
(Continued)

(56) References Cited

U.S. PATENT DOCUMENTS 3,972,210 A * 8/1976 Toivonen ............ E05B 29/0013 70/377
4,667,493 A 5/1987 Takahashi
(Continued)

FOREIGN PATENT DOCUMENTS

DE 295 00 944 U1 12/1999
JP 2000-096889 A 4/2000
(Continued)

OTHER PUBLICATIONS

Written Opinion issued in corresponding international application, EP23151518.0 dated Jun. 12, 2024 (Year: 2024).*
(Continued)

*Primary Examiner* — Kristina R Fulton
*Assistant Examiner* — Emily G. Brown
(74) *Attorney, Agent, or Firm* — Rosenberg, Klein & Lee

(57) ABSTRACT

A disc tumbler cylinder lock has a lock cylinder base, multiple discs, and multiple gaskets. The lock cylinder base has an accommodating space, a position limiting opening, and an accommodating opening. Each of the discs has a position limiting protrusion and a disc notch. Each of the gaskets has a ring body, a position limiting segment, and a rotation limiting segment. The position limiting segment protrudes outward from an outer annular surface of the ring body along a radial direction. The rotation limiting segment protrudes from the position limiting segment along an axial direction of the lock sleeve. The discs and the gaskets are staggeredly accommodated in the accommodating space. A side surface of the position limiting protrusion abuts a side surface of the position limiting opening. Two sides of the position limiting segment abut two opposite sides of the position limiting opening.

8 Claims, 10 Drawing Sheets

(58) Field of Classification Search
CPC ...... E05B 21/06; E05B 21/066; E05B 27/006; E05B 15/0053; E05B 17/007; E05B 9/04; Y10T 70/7537
USPC ........................................................... 70/365
See application file for complete search history.

(56) References Cited

U.S. PATENT DOCUMENTS

| | | | | | |
|---|---|---|---|---|---|
| 4,686,843 | A * | 8/1987 | Martikainen | E05B 21/066 | 70/366 |
| 6,003,351 | A | 12/1999 | Chao | | |
| 11,885,150 | B2 * | 1/2024 | Kinnunen | E05B 29/0013 | |
| 2003/0019263 | A1 * | 1/2003 | Chen | E05B 31/00 | 70/366 |
| 2003/0051521 | A1 * | 3/2003 | Mielonen | E05B 21/066 | 70/365 |
| 2014/0373581 | A1 * | 12/2014 | Uljens | E05B 29/0013 | 70/357 |
| 2015/0292238 | A1 * | 10/2015 | Bastianini | E05B 27/0007 | 70/344 |
| 2023/0295956 | A1 * | 9/2023 | Lin | E05B 29/00 | 70/20 |

FOREIGN PATENT DOCUMENTS

| | | | | |
|---|---|---|---|---|
| JP | 2009-133149 | A | | 6/2009 |
| JP | 2010-001614 | A | | 1/2010 |
| TW | 169020 | U | * | 9/1991 |
| TW | M252772 | U | | 12/2004 |

OTHER PUBLICATIONS

Machine generated translation of TW 169020U, description and claims. (Year: 2024).*

* cited by examiner

DISC TUMBLER CYLINDER LOCK

BACKGROUND OF THE INVENTION

1. Field of the Invention

The present invention relates to a lock, especially to a disc tumbler cylinder lock.

2. Description of the Prior Arts

With reference to FIG. 10, a conventional disc tumbler cylinder lock has a lock sleeve (not shown in drawings) and a lock cylinder 90 mounted in the lock sleeve. The lock cylinder 90 has a lock cylinder frame 91, multiple discs 92, multiple gaskets 93, and a needle roller 94. An end of the lock cylinder frame 91 forms an accommodating space 911, a position limiting opening 912, and an accommodating opening 913. Another end of the lock cylinder frame 91 forms a tongue fixing rod 914. A tongue (not shown in drawings) and a position limiting sheet are configured to be installed on the tongue fixing rod 914. Each of the discs 92 has a key hole. An outer annular surface of each of the discs 92 forms a protrusion 921 and a disc notch 922. An outer annular surface of each of the gaskets 93 forms a positioning segment 931 protruding and shaped as an annular sector. The discs 92 and the gaskets 93 are staggeredly accommodated in the accommodating space 911. The protrusion 921 abuts a side of the position limiting opening 912. The disc notches 922 are staggered when viewed from a side. Two sides of the positioning segments 931 respectively abut two sides of the position limiting opening 912. The needle roller 94 is mounted in the accommodating opening 913.

For unlocking, a key (not shown in drawings) is inserted into the key hole of the discs 92, and then the key is rotated 90 degrees clockwise. Serrations of the key corresponding in positions to the discs 92 push the discs 92 till the disc notches 922 of the discs 92 are aligned. Then, the needle roller 94 is allowed to move into the disc notches 922 so that the lock cylinder 90 is allowed to rotate relative to the lock sleeve, thereby unlocking the lock.

By changing the number of the discs 92 and the positions of the disc notches 922 on the discs 92, the conventional disc tumbler cylinder lock can achieve good anti-theft effect, so the conventional disc tumbler cylinder lock is often used in cabinets and vehicles with high anti-theft requirements.

However, the aforementioned lock cylinder does not have any spring, such that when the conventional disc tumbler cylinder lock is impacted with strong vibration such as vibration due to poor road conditions, the discs 92 might rotate unexpectedly, which makes it difficult or even impossible to insert the key, or makes the key turned but without being inserted to the end, causing the key to be damaged or broken.

To sum up, the conventional disc tumbler cylinder lock needs to be improved.

To overcome the shortcomings, the present invention provides a disc tumbler cylinder lock to mitigate or obviate the aforementioned problems.

SUMMARY OF THE INVENTION

The main objective of the present invention is to provide a disc tumbler cylinder lock that can prevent discs from rotating unexpectedly.

The disc tumbler cylinder lock has a lock sleeve, a lock cylinder base, multiple discs, multiple gaskets, and a needle roller. The lock sleeve is a hollow tube. An end of the lock cylinder base forms an accommodating space, a position limiting opening, and an accommodating opening. Another end of the lock cylinder base forms a fixing rod. The lock cylinder base is rotatably mounted in the lock sleeve. Each of the discs has a key hole, a position limiting protrusion, and a disc notch. The key hole is formed through the disc. The position limiting protrusion protrudes from an outer annular surface of the disc. The disc notch is concaved from the outer annular surface of the disc. Each of the gaskets has a ring body, a position limiting segment, a rotation limiting segment, and a concave segment. The ring body is a ring. The position limiting segment protrudes outward from an outer annular surface of the ring body along a radial direction. The rotation limiting segment protrudes from the position limiting segment along an axial direction of the lock sleeve. The concave segment is concaved from the outer annular surface of the ring body. The discs and the gaskets are staggeredly accommodated in the accommodating space. A side surface of the position limiting protrusion abuts a side surface of the position limiting opening. Two sides of the position limiting segment abut two opposite side edges of the position limiting opening. The rotation limiting segment is adjacent to another side surface of the position limiting protrusion. A needle roller is mounted in the accommodating opening.

Since each of the gaskets has a rotation limiting segment, when the disc tumbler cylinder lock is in a locked state, the rotation limiting segment and a side surface of the position limiting opening of the lock cylinder base can limit the position limiting protrusion of the discs to significantly reduce the rotation of the discs upon impacted, thereby enhancing structural stability. Besides, since the rotation limiting segment is a spring sheet, when a user turns the key to rotate the discs, the position limiting protrusion of the discs can easily push and deform the rotation limiting segment to slide over the rotation limiting segment, thereby reducing the rotational resistance upon turning the key.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
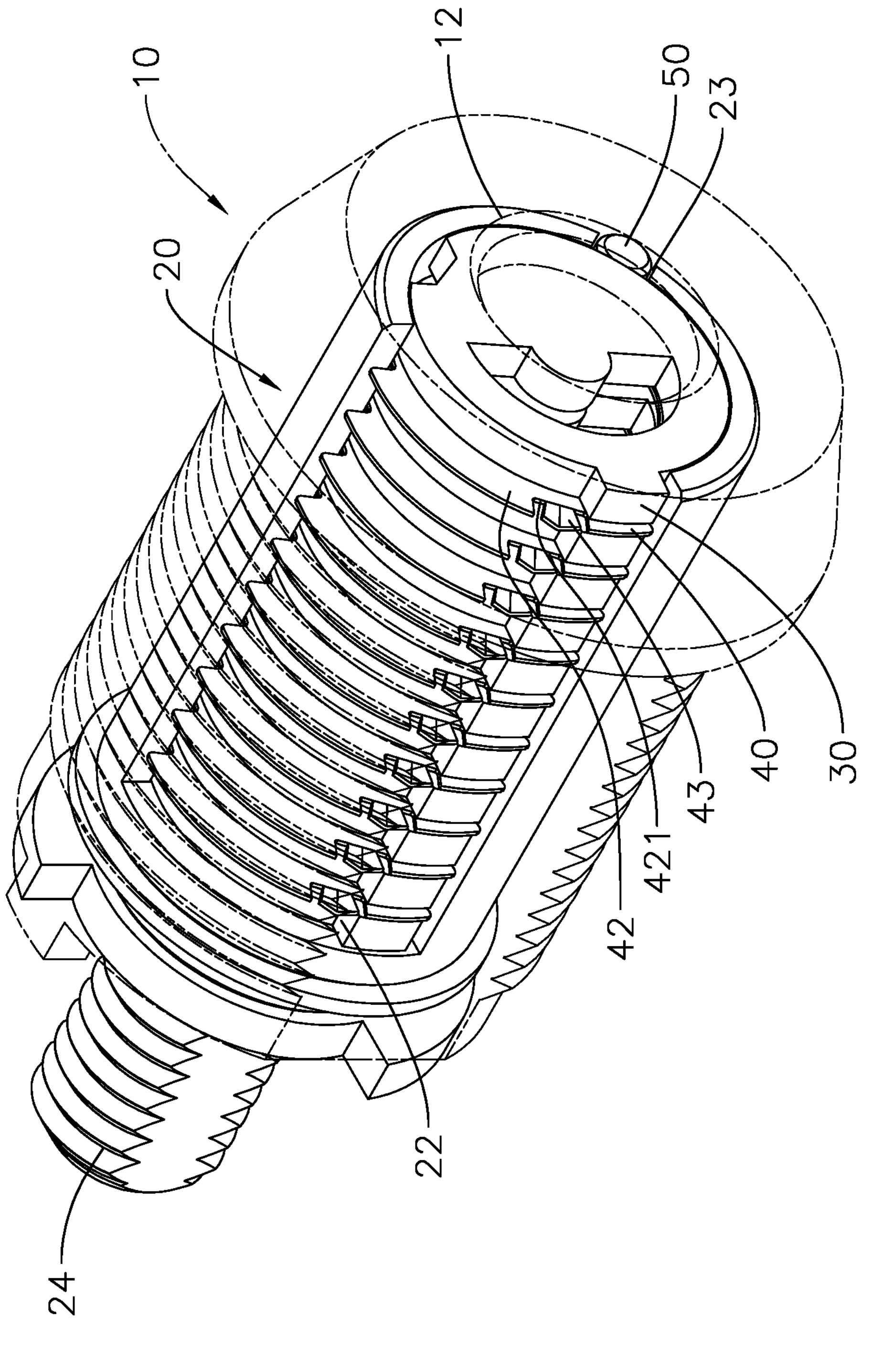
FIG. 1 is a perspective view of a disc tumbler cylinder lock in accordance with the present invention.

With reference to FIG. 1, a disc tumbler cylinder lock in accordance with the present invention comprises a lock sleeve 10, a lock cylinder base 20, multiple disc 30, multiple gasket 40, and a needle roller 50.

Figure 2:
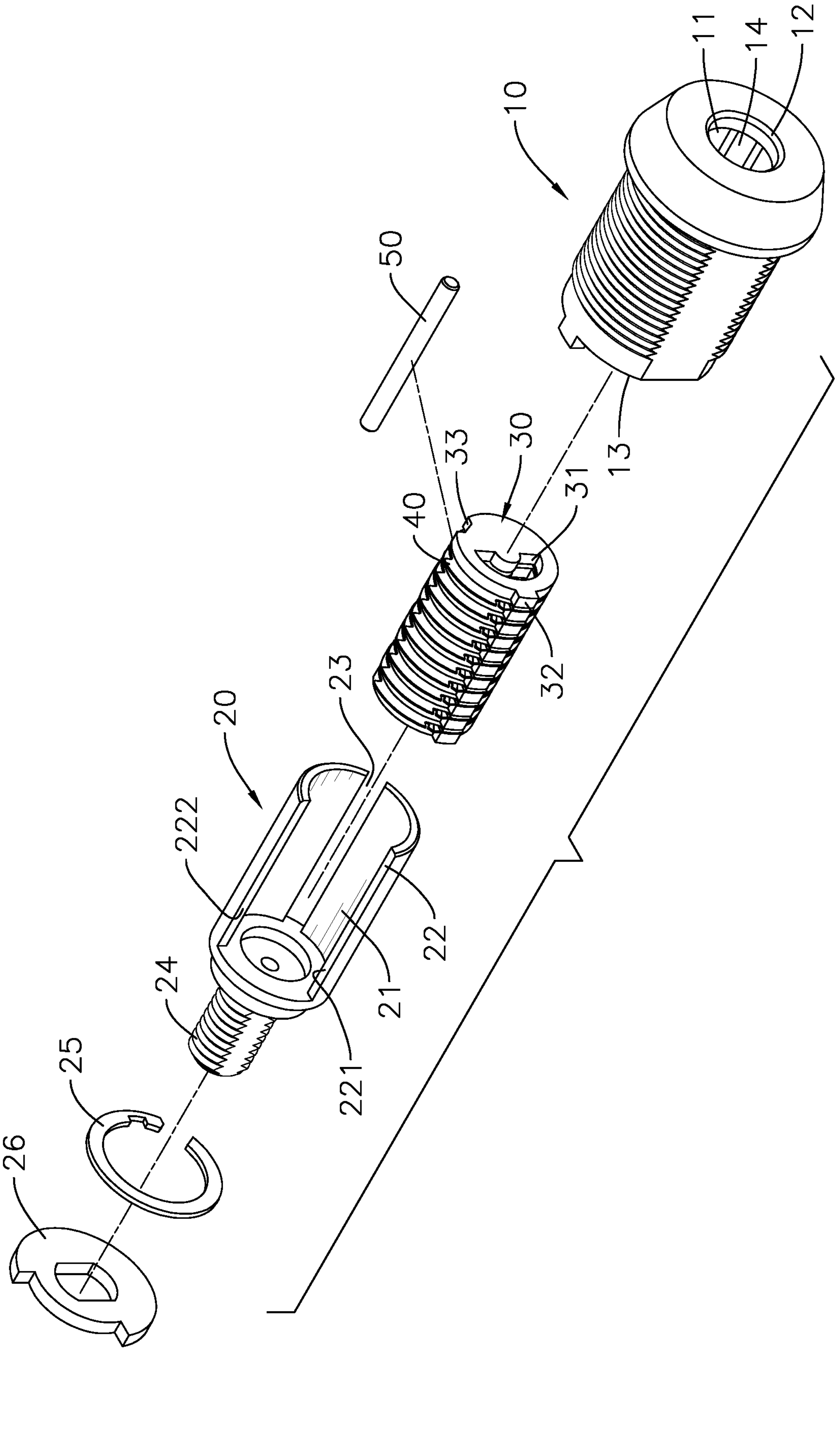
FIG. 2 is an exploded view of the disc tumbler cylinder lock in FIG. 1.

With reference to FIG. 2, the lock sleeve 10 is a hollow tube and forms a lock cylinder chamber 11, a key opening 12, and an assembling opening 13 connected to each other. An inner wall of the lock sleeve 10 forms a pin slot 14. The pin slot 14 extends along a direction form an end of the lock sleeve 10 to another and is an elongated slot. The lock sleeve 10 is a standard component of the prior art, and the detailed structure of the lock sleeve 10 will be omitted.

Figure 3:
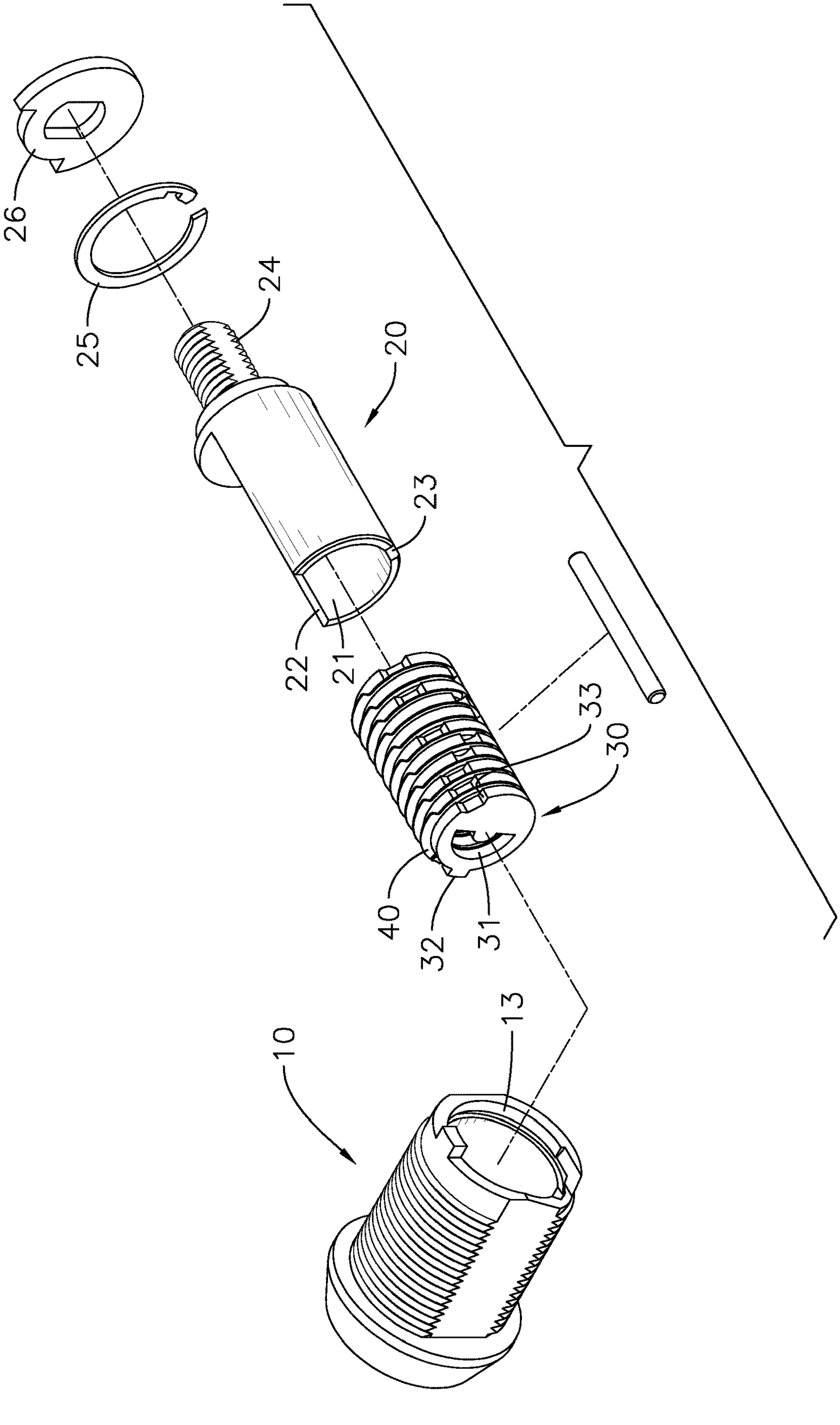
FIG. 3 is another exploded view of the disc tumbler cylinder lock in FIG. 1, viewed from another angle.

With reference to FIGS. 2 and 3, the lock cylinder base 20 is tubular and forms an accommodating space 21, a position limiting opening 22, and an accommodating opening 23 connected to each other. The position limiting opening 22 and the accommodating opening 23 are both elongated holes and are respectively located in two opposite sides. The position limiting opening 22 has a first side surface 221 and a second side surface 222 respectively located in two opposite side edges. An end of the lock cylinder base 20 forms a fixing rod 24 with an outer thread. The section of the lock cylinder base 20 having the accommodating space 21 is moveably mounted in the lock sleeve 10 and a position limiting ring 25 and a rotation limiting sheet 26 are sleeved on the lock cylinder base 20 such that the lock cylinder base 20 is limited to rotate in a particular position within a particular angular range. A tongue (not shown in drawings) is adapted to be mounted on the fixing rod 24. The lock cylinder base 20, the position limiting ring 25, and the rotation limiting sheet 26 are standard components of the prior art, and the detailed structures of the lock cylinder base 20, the position limiting ring 25, and the rotation limiting sheet 26 will be omitted.

Figure 4:
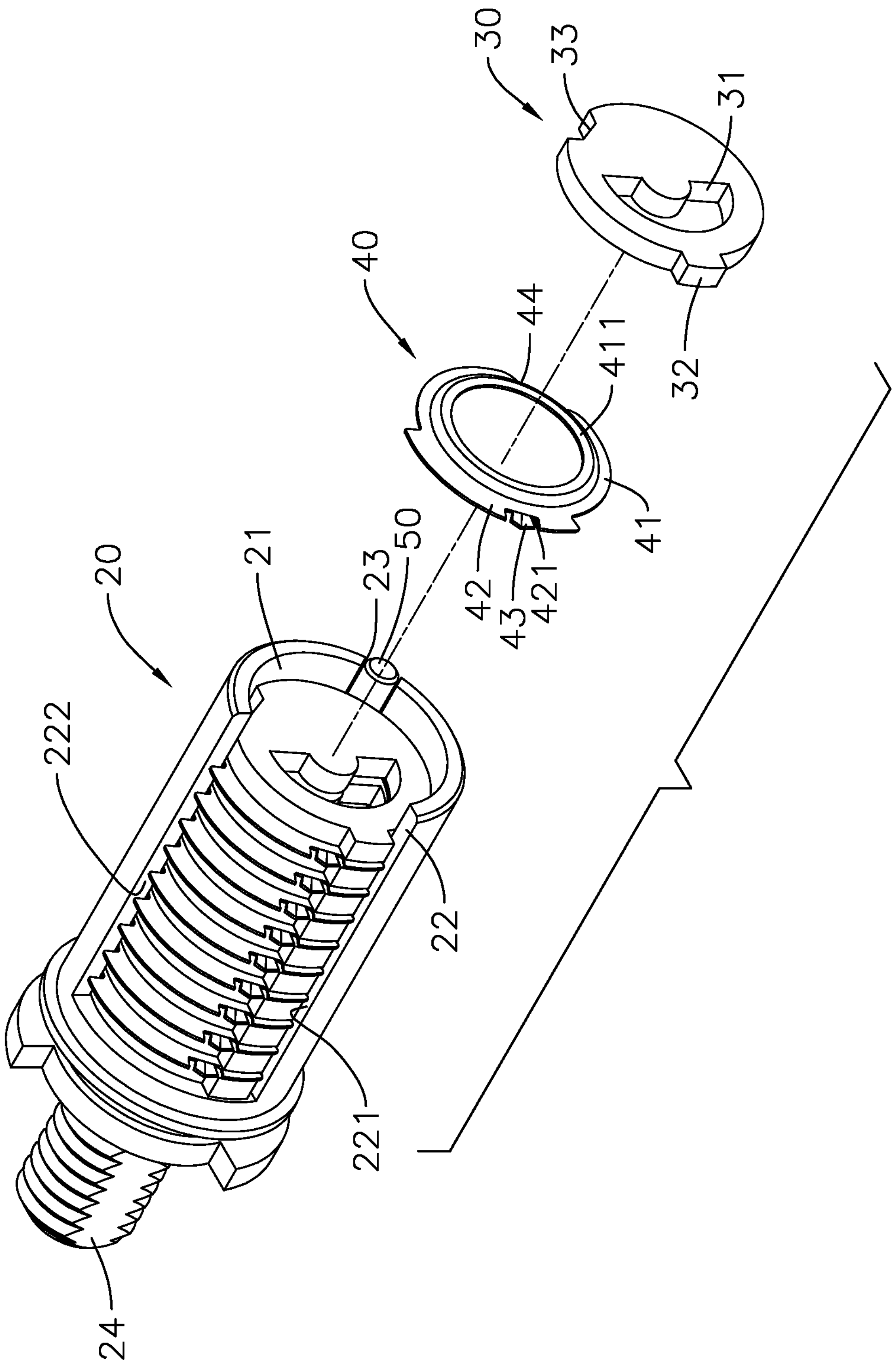
FIG. 4 is a partial exploded view of the disc tumbler cylinder lock in FIG. 1.
Figure 5:
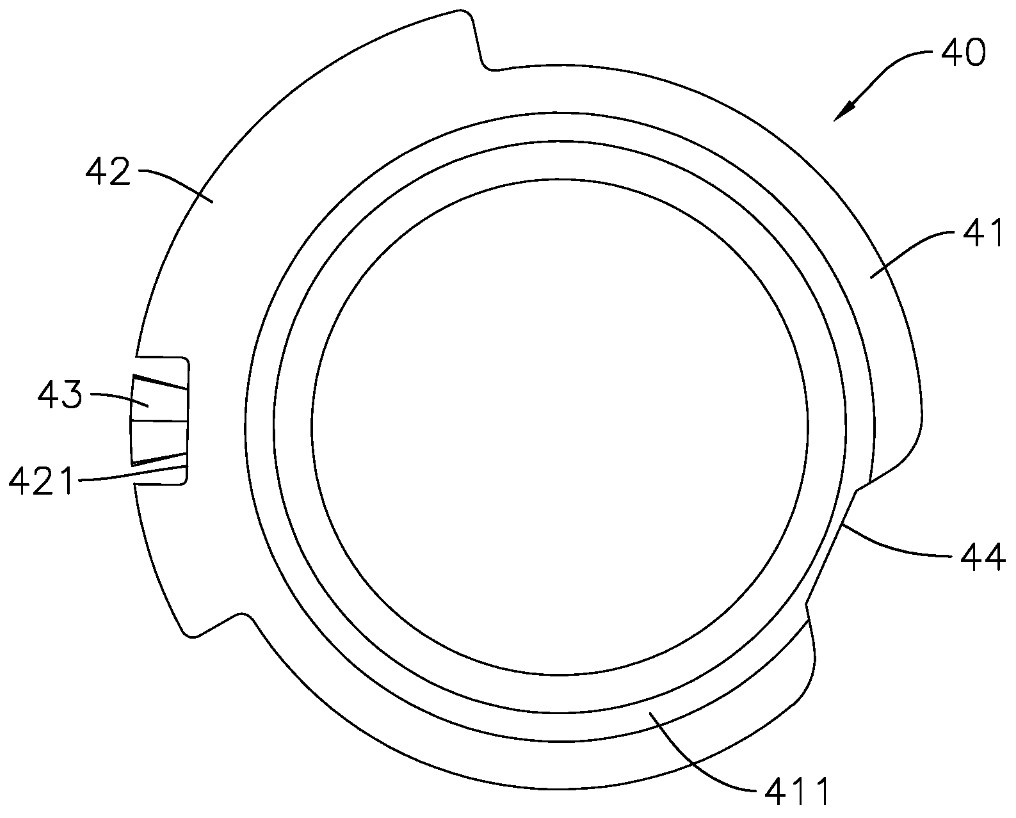
FIG. 5 is a front view of the disc tumbler cylinder lock in FIG. 1, showing the gasket.
Figure 6:
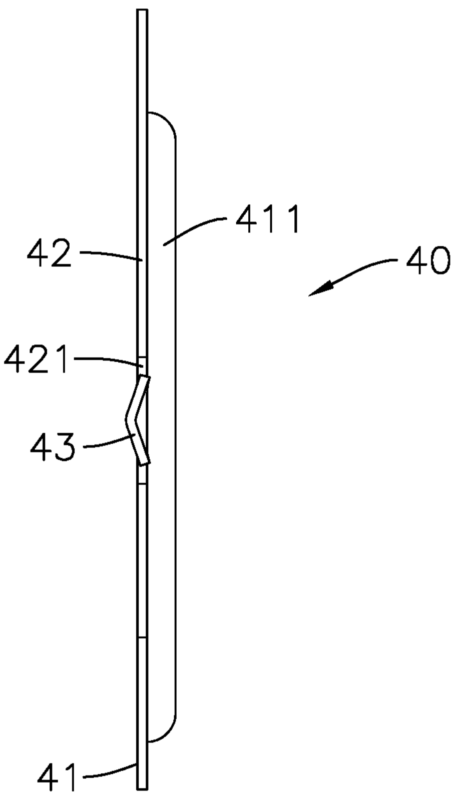
FIG. 6 is a side view of the disc tumbler cylinder lock in FIG. 1, showing the gasket.

With reference to FIGS. 3 and 4, each of the discs 30 is round and has a key hole 31, a position limiting protrusion 32, and a disc notch 33. The key hole 31 is formed through the disc 30. The position limiting protrusion 32 protrudes from an outer annular surface of the disc 30. At least two of the disc notches 33 of the discs 30 have different distances between the position limiting protrusion 32. The discs 30 are a standard component of the prior art, and the detailed structure of the discs 30 will be omitted.

With reference to FIGS. 3 to 6, each of the gaskets 40 has a ring body 41, a position limiting segment 42, a rotation limiting segment 43, and a concave segment 44. The ring body 41 is a ring with a frame circling a center space therein. A rib 411 protrudes from a side surface of the ring body 41 and extends annularly. The position limiting segment 42 protrudes from an outer annular surface of the ring body 41 and extends radially. Specifically, the position limiting segment 42 is in the shape of a sector, and a gasket notch 421 is formed inward on the position limiting segment 42. The rotation limiting segment 43 protrudes from the gasket notch 421 along an axial direction of the lock sleeve 10. In this embodiment, the rotation limiting segment 43 is a bent sheet with a V-shaped cross section, parallel to the axial direction and perpendicular to a radial direction of the ring body 41. As viewed along the radial direction of the ring body 41, the rotation limiting segment 43 protrudes opposite to the rib 411. But the configuration of the rotation limiting segment is not limited thereto, as the rotation limiting segment 43 can be configured as desired. The concave segment 44 is concaved inward from the outer annular surface of the ring body 41 and is located opposite to the position limiting segment 42. The discs 30 and the gaskets 40 are staggeredly accommodated in the accommodating space 21 of the lock cylinder base 20. The rotation limiting segment 43 is adjacent to a side surface of the position limiting protrusion 32. Two sides of the position limiting segment 42 respectively abut the first side surface 221 and the second side surface 222 of the position limiting opening 22. Each of the discs has the following two states. When the present invention is locked, another side surface of the position limiting protrusion 32 abuts the first side surface 221 of the position limiting opening 22, and the disc notches 33 of the discs 30 are not aligned. When the present invention is unlocked, some of the discs 30 are rotated till the disc notches 33 are aligned.

With reference to FIGS. 1 and 2, the needle roller 50 is mounted in the accommodating opening 23. Specifically, the needle roller 50 is located between the pin slot 14 of the lock sleeve 10 and the accommodating opening 23. The needle roller 50 correspond to the disc notches 33 of the discs 30 in position and shape.

Figure 7:
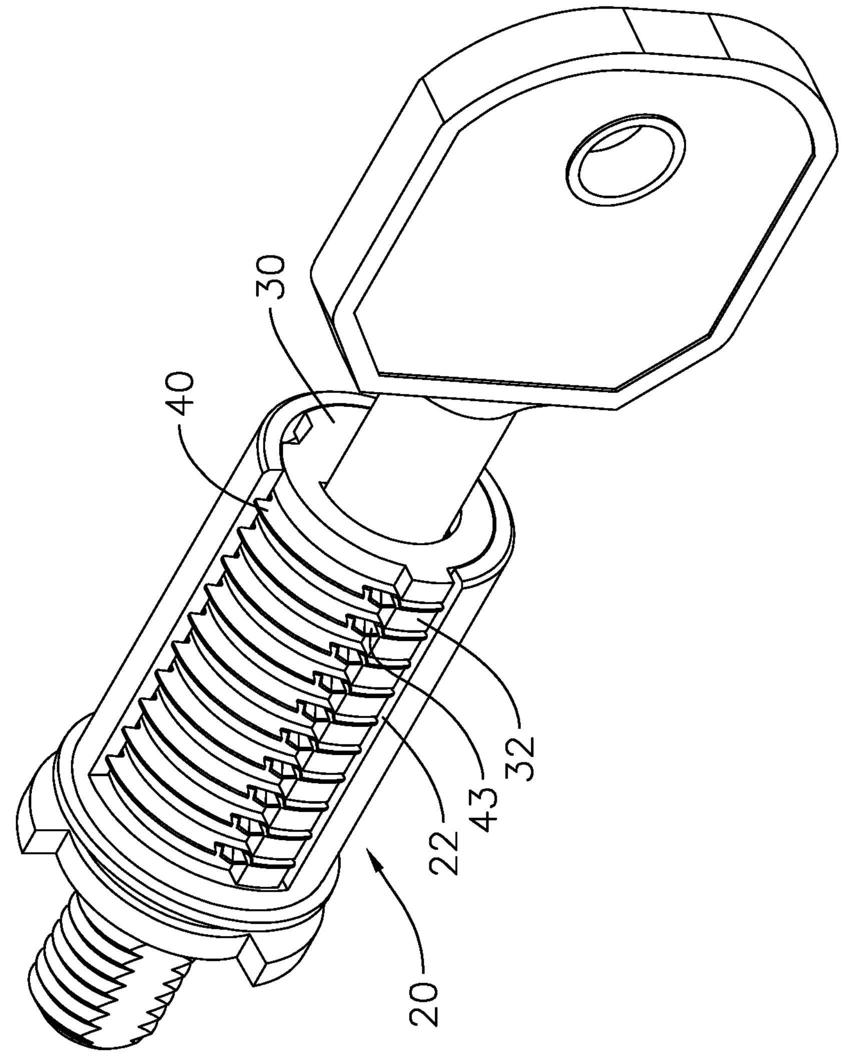
FIG. 7 is an operational view of the disc tumbler cylinder lock in FIG. 1.
Figure 8:
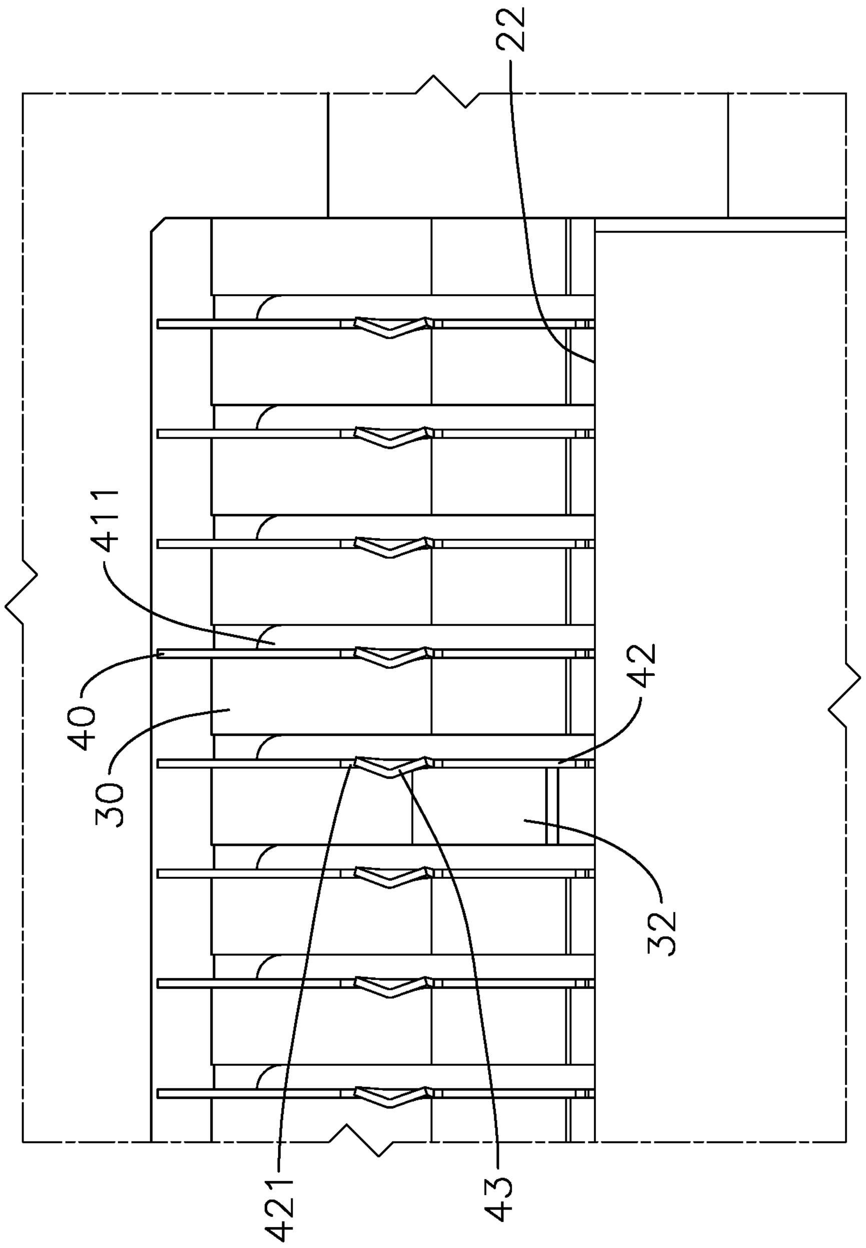
FIG. 8 is a partial enlarged view of the disc tumbler cylinder lock in FIG. 1.

With reference to FIGS. 7 and 8, the present invention is unlocked and locked by a key, and the operation is conventional and will not be detailed below. The gaskets 40 reduce the friction between the discs 30. When being locked, the rotation limiting segment 43 of the gaskets 40 and the first side surface 221 of the position limiting opening 22 limit the position of the discs 30 therebetween, such that even if the discs 30 are impacted by strong vibration, the rotation range of the discs 30 is significantly reduced. In other words, even if the discs 30 rotate, the rotation range is very small, and therefore would not affect the insertion of the key, facilitating the key always to be inserted to the end, which improves the stability of the structure and prevent the large rotation of the discs 30. Additionally, since the rotation limiting segment 43 is a spring sheet, when a user turns the key to rotate the discs 30, the position limiting protrusion 32 of the discs 30 can easily push and deform the rotation limiting segment 43 to slide over the rotation limiting segment 43, thereby reducing the rotational resistance upon turning the key.

Figure 9:
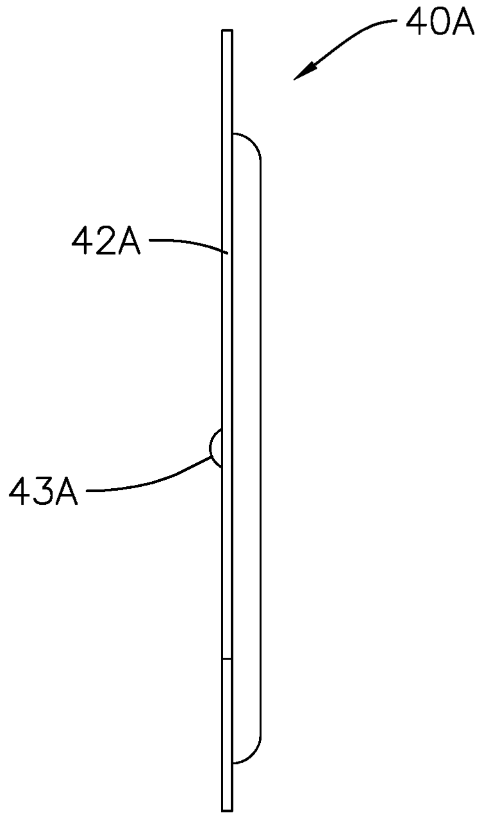
FIG. 9 is a side view of a disc tumbler cylinder lock in accordance with the present invention, showing the gasket in another embodiment.
Figure 10:
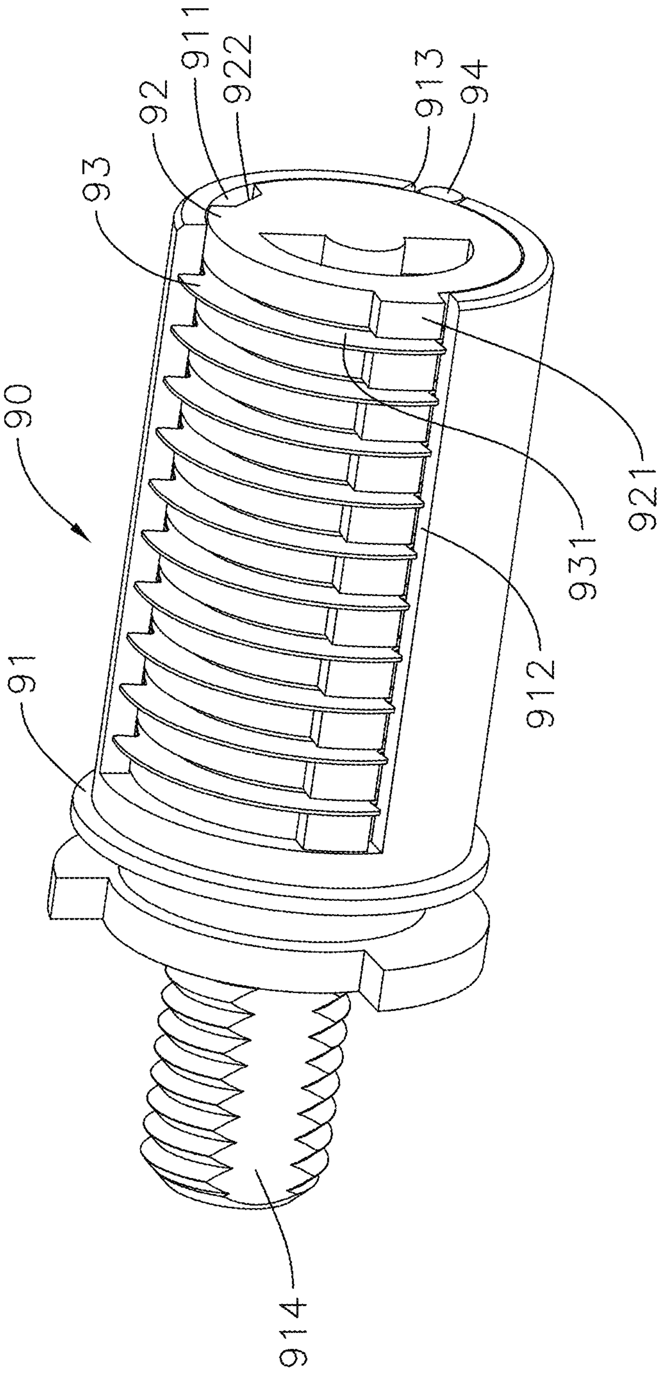
FIG. 10 PRIOR ART
FIG. 10 is a perspective view of a conventional disc tumbler cylinder lock.

With reference to FIG. 9, another embodiment of the present invention is shown. In this embodiment, the position limiting segment 42A of each of the gaskets 40A does not have the gasket notch 421; instead, the rotation limiting segment 43A is a protrusion protruding from a side surface of the position limiting segment 42A, thereby achieving the same effect that prevents the discs 30 from large-range rotation due to vibration.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A disc tumbler cylinder lock comprising:

a lock sleeve being a hollow tube;

a lock cylinder base rotatably mounted in the lock sleeve;

an end of the lock cylinder base forming an accommodating space;

a position limiting opening; and an accommodating opening;

another end of the lock cylinder base forming
a fixing rod;
multiple discs; each of the discs having
a key hole formed through the disc;
a position limiting protrusion protruding from an outer annular surface of the disc; and
a disc notch concaved from the outer annular surface of the disc;
multiple gaskets; each of the gaskets having
a ring body being a ring;
a position limiting segment protruding outward from an outer annular surface of the ring body along a radial direction;
a rotation limiting segment protruding from the position limiting segment along an axial direction of the lock sleeve; and
a concave segment concaved from the outer annular surface of the ring body;
the discs and the gaskets staggeredly accommodated in the accommodating space; a side surface of the position limiting protrusion abutting a side surface of the position limiting opening; two sides of the position limiting segment abutting two opposite side edges of the position limiting opening; each rotation limiting segment being adjacent to another side surface of the position limiting protrusion;
a needle roller mounted in the accommodating opening;
wherein each of the gaskets has a gasket notch concaved inward; the rotation limiting segment is a bent sheet protruding from the gasket notch along the axial direction of the lock sleeve.

2. The disc tumbler cylinder lock as claimed in claim 1, wherein the rotation limiting segment has a V-shaped cross-section.

3. The disc tumbler cylinder lock as claimed in claim 2, wherein the position limiting segment is shaped as a sector.

4. The disc tumbler cylinder lock as claimed in claim 3, wherein the ring body has a rib extending annularly, protruding from a side surface of the ring body, and abutting one of the discs.

5. The disc tumbler cylinder lock as claimed in claim 4, wherein the lock sleeve forms
a lock cylinder chamber;
a key opening; and
an assembling opening, the lock cylinder chamber, the key opening, and the assembling opening connected to each other;
an inner wall of the lock sleeve forms
a pin slot corresponding in shape and position to the needle roller.

6. The disc tumbler cylinder lock as claimed in claim 1, wherein the position limiting segment is shaped as a sector.

7. The disc tumbler cylinder lock as claimed in claim 6, wherein the ring body has a rib extending annularly, protruding from a side surface of the ring body, and abutting one of the discs.

8. The disc tumbler cylinder lock as claimed in claim 7, wherein the lock sleeve forms
a lock cylinder chamber;
a key opening; and
an assembling opening; the lock cylinder chamber, the key opening, and the assembling opening connected to each other;
an inner wall of the lock sleeve forms a pin slot; the pin slot corresponding in shape and position to the needle roller.

* * * * *